United States Patent [19]

Ishii

[11] Patent Number: 4,656,531
[45] Date of Patent: Apr. 7, 1987

[54] NOISE-ELIMINATING APPARATUS FOR A VIDEO TAPE RECORDER

[75] Inventor: Takashi Ishii, Chigasaki, Japan

[73] Assignee: Kabushiki Kaisha Toshiba, Kawasaki, Japan

[21] Appl. No.: 610,413

[22] Filed: May 15, 1984

[30] Foreign Application Priority Data

May 20, 1983 [JP] Japan .................. 58-87479

[51] Int. Cl.⁴ ...................... H04N 5/782; H04N 5/94
[52] U.S. Cl. .................... 360/19.1; 360/64;
360/38.1; 358/336; 358/340
[58] Field of Search ............ 360/38.1, 64, 19.1;
358/336, 340, 328, 314, 343

[56] References Cited

U.S. PATENT DOCUMENTS

| | | | |
|---|---|---|---|
| 3,346,702 | 10/1967 | Heizer | 360/64 |
| 4,032,966 | 6/1977 | Kenney | 358/314 |
| 4,542,418 | 9/1985 | Yoneyama | 360/64 |
| 4,559,567 | 12/1985 | Maruichi | 358/340 |

FOREIGN PATENT DOCUMENTS

| | | | |
|---|---|---|---|
| 68188 | 1/1983 | European Pat. Off. | 360/19.1 |
| 80812 | 6/1980 | Japan | 360/19.1 |

Primary Examiner—Alan Faber
Attorney, Agent, or Firm—Cushman, Darby & Cushman

[57] ABSTRACT

A noise-eliminating apparatus for a video tape recorder wherein the high frequency signals of the first and second channels, reproduced by a helical scan type video tape recorder, an alternately selected by the corresponding first and second switches. The selected high frequency signal is supplied to the main demodulator and auxiliary demodulator. The changeover operations of the first and second switches are carried out at a prescribed internal by the first and second control signals. An output signal from the main demodulator in shut off by a third switch during the period in which the high frequency signals of the first and second channels partly overlap each other. The shut off period is supplemented by an output demodulated signal from the auxiliary demodulator.

8 Claims, 3 Drawing Figures

F I G. 2
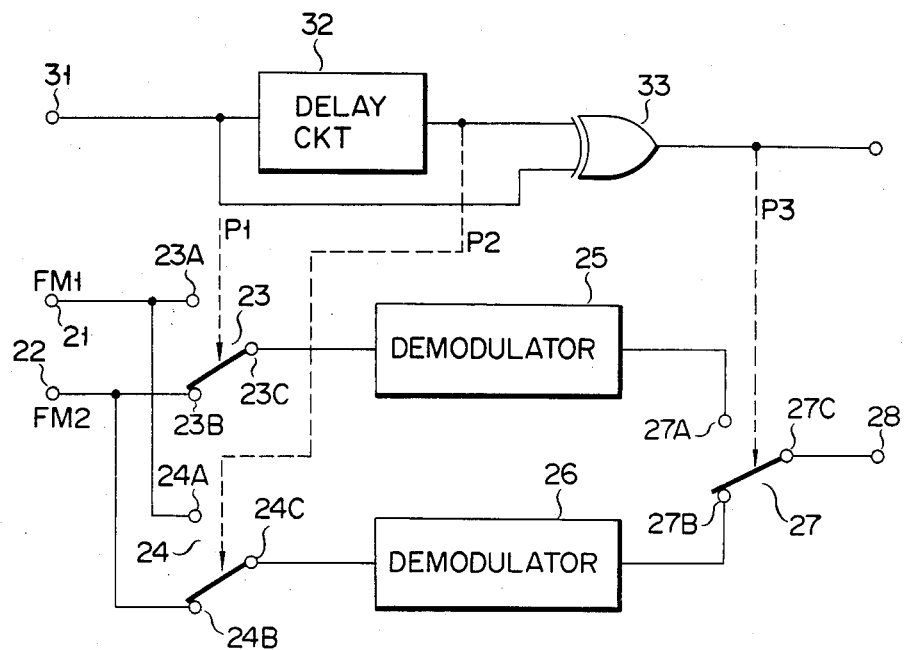

NOISE-ELIMINATING APPARATUS FOR A VIDEO TAPE RECORDER

BACKGROUND OF THE INVENTION

This invention relates to a noise-eliminating apparatus for a video tape recorder and, more particularly, to a type which can be effectively applied to a circuit for reproducing high frequency signals recorded in a time-division fashion (FM audio signals).

Using the conventional helical scan type video tape recorder (hereafter referred to as the "VTR"), FM audio signals are recorded on an exclusive audio track on a tape by means of an exclusive audio magnetic head. With such an FM-audio signal recording system, however, the frequency property and dynamic range for ensuring a good recording of stereo signals and sound multiplex signals have been found insufficient. This drawback arises from the fact that the tape travels slowly and the continuous audio track is narrow.

For resolution of the above-mentioned difficulties, a system has been proposed which is designed to record both video signals and FM audio signals on the video track. According to this proposed system, the FM audio signals are recorded on the recording tracks by alternately operating first and second video heads. This proposed system fully satisfies the frequency property and dynamic range required for the recording of FM audio signals.

The FM audio signals, time-divisionally recorded by the helical scan system and reproduced by the alternately operating first and second video heads, must be converted into regular, continuous FM audio signals to satisfy the listener.

FIG. 1 shows the conventional circuit for converting first-channel FM audio signals, reproduced from the first video head, and second-channel FM audio signals, reproduced from the second video head, into the regular, continuous FM audio signals. According to said conventional circuit, first-channel FM audio signals (FM 1) are supplied to a first FM demodulator 13 through an input terminal 11, for demodulation, and second-channel FM audio signals (FM 2) are delivered to a second FM demodulator 14 through an input terminal 12. Demodulated output signals from the first and second FM demodulators 13, 14 are respectively carried to the first and second input terminals 15A, 15B of a switch 15. The operation of this switch 15 is controlled in such a manner that the first input terminal 15A is used during the tape scanning period of the first video head, that is, one field, and the second input terminal 15B is used during the tape scanning period of the second video head, that is, one field. As a result, continuous demodulated audio signals are sent forth from an output terminal 16.

According to the above-mentioned conventional circuit, the first and second demodulators 13, 14 demodulate FM audio signals in the duty ratio of 1:1. In other words, the switch 15 selects output demodulated audio signals from the first and second FM demodulators 13, 14 in the duty ratio of 1:1. Consequently, said first and second FM demodulators 13, 14 should have identical properties and functions. Therefore, the first and second FM demodulators 13, 14 are required to be of an expensive, high-quality type. Further, it is necessary to apply an advanced technique in order to ensure the identical properties and functions of both FM demodulators 13 and 14. This matching work consumes a great deal of time.

The first and second input terminals 11, 12 are supplied with high frequency FM audio signals in such a manner that the FM audio signal FM1, for example, is delivered to the first input terminal 11 during one field, and the FM audio signal FM2, for example, is sent forth to the second input terminal 12 during the succeeding field, using this scheme, the rear-end portion of the preceding FM audio signal FM1 should overlap the forward-end portion of the succeeding FM audio signal FM2. The rear-end portion of said FM audio signal FM2, supplied to the second input terminal 12 during said succeeding field should overlap the forward-end portion of said FM audio signal FM1, supplied to the first input terminal 11 during a field following the aforementioned, succeeding field.

Since the FM audio signals FM1, FM2 are originally continuous signals, the phases of both signals FM1, FM2 at the first and secind input terminals 11, 12 should agree with each other. However, it often happens that said phases fail to be identical due to the contraction of a magnetic tape and the irregular rotation of the rotary components (such as the tape-feeding mechanism and rotary cylinder) of the VTR. If the phases of said FM audio signals FM1, FM2 fail to be identical during the period in which the end-portions of said signals overlap each other, then noise arises when these signals are demodulated, e.g. when output signals from the first and second demodulators 13, 14 are converted into continuous signals by the switch 15.

For the resolution of the above-mentioned problem, the Japanese patent disclosure (Kokai) No. 55-80,812 sets forth a system which is characterized in that first and second channel-selecting switches are respectively provided in front of the first and second modulators 13, 14, and said switches are operated at different points of time during the aforesaid period in such that end-portions of the FM audio signals overlap each other. This proposed system indeed has the advantage that even if the phases of the FM audio signals FM1, FM2 are displaced from each other during the aforesaid overlapping period, noises can be suppressed. But said system is still accompanied with the previously described drawback, because, when demodulated output signals from the first and second FM demodulators are converted into a continuous signal, the duty ratio of the demodulated output signals is chosen to be 1:1. In other words, the first and second FM demodulators are required to be of the high-quality, expensive type and also have exactly, identical properties.

SUMMARY OF THE INVENTION

This invention has been accomplished in view of the above-mentioned circumstances, and is intended to provide a noise-eliminating apparatus for a video tape recorder which ensures the reduction of the cost of a demodulator, enables the modulator to be properly conditioned easily and quickly, and further eliminates switching noises by a simple arrangement.

To attain the above-mentioned object, this invention provides a noise-eliminating apparatus for a video tape recorder which comprises:

switching means for alternately selecting first and second channels supplied with high frequency signals recorded by the helical scan system;

main demodulating means for demodulating output, high frequency signals from said first and second channels and conducting said demodulated output signals to an output terminal;

an output signal-selecting switch for effecting an electric shut off a signal from the main demodulator to output terminal during the period in which the high frequency signals of the first and second channels partly overlap each other; and auxiliary demodulating means for conducting to the output terminal a signal resulting from the demodulation of a high frequency signal following the high frequency signal previously supplied to said main demodulating means, only during the period in which said output signal-selecting switch shuts off an output signal from said main demodulating means.

BRIEF DESCRIPTION OF THE DRAWINGS

FIG. 2 is a circuit diagram of a noise-eliminating apparatus embodying this invention for a video tape recorder.

DETAILED DESCRIPTION OF THE PREFERRED EMBODIMENT

Figure 1:
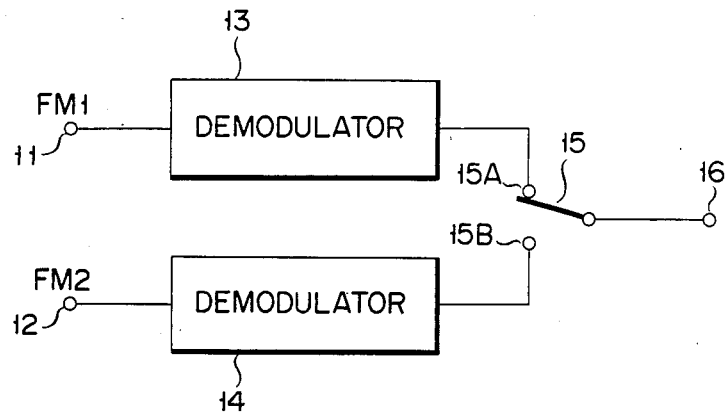
FIG. 1 schematically shows the arrangement of the conventional FM demodulating apparatus for a video tape recorder.

FIG. 2 shows the circuit arrangement of the noise-eliminating apparatus of the invention. The first and second input terminals 21, 22 are supplied with the high frequency, FM audio signals FM1, FM2 of the first and second channels, delivered from the corresponding first and second video heads of a video tape recorder (hereafter referred to as the "VTR"). The FM audio signals FM1, FM2 are picked up from the magnetic tape by means of the helical scanning process. The audio signals FM1, FM2 overlap each other at the adjacent portions.

The first input terminal 21 is connected to one input contact 23A of a channel selection switch 23 and also to one input contact 24A of a chanel selection switch 24. The second input terminal 22 is connected to the other input contact 23B of the channel selection switch 23, and also to the other input contact 24B of the channel selection switch 24. The output contacts 23C, 24C are respectively connected to the input terminals of the main FM demodulator 25 and the auxiliary FM demodulator 26. The output terminals of the main FM modulator 25 and the auxiliary FM demodulator 26 are respectively connected to the input contacts 27A, 27B of an output selection switch 27. The output contact 27C of said output selection switch 27 is connected to an output contact 28 from which a continuous audio signal is sent forth.

The operation of the aforementioned first, second, and third switches 23, 24, 27 is controlled by the corresponding control signals P1, P2, P3. The control signal P2 is produced by delaying a control signal P1 supplied to an input terminal 31 by a delay circuit 32. The control signal P3 is constituted by an output signal from an exclusive OR circuit 33 which receives both control signals P1, P2. The control signal P1 is constituted by a delayed output signal issued from, for example, a head-changeover pulse generator or video-field synchronization-pulse generator involved in the VTR.

Figure 3:
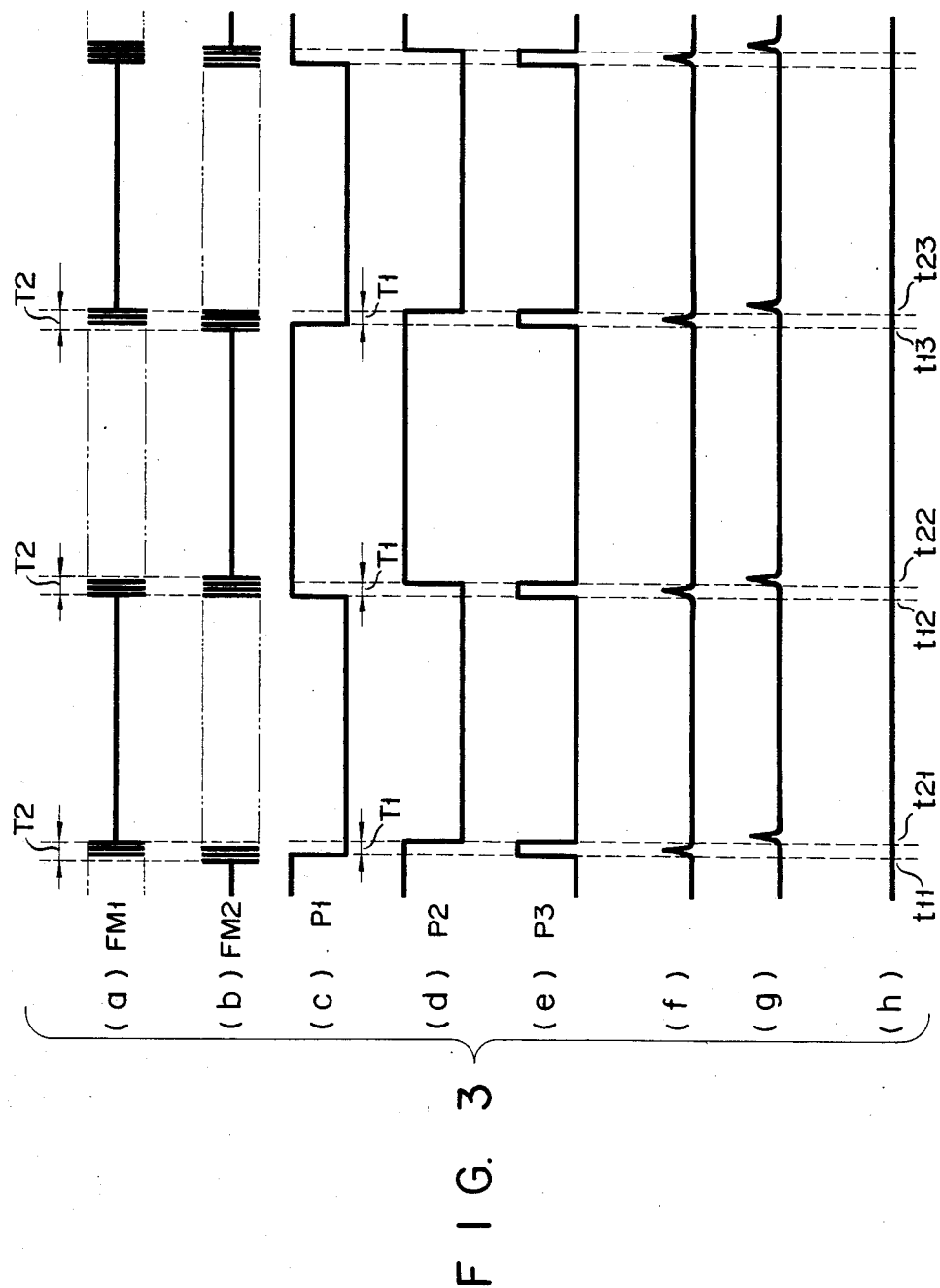
FIG. 3 is a timing chart illustrating the operation of the circuit of FIG. 2.

FIG. 3 shows the time sequence of the FM audio signals FM1, FM2 supplied to the first and second input terminals 21, 22 and the aforementioned control signals P1, P2, P3. As seen from FIG. 3, the switch 23 renders the contacts 23A, 23C conductive when the control signal P1 has a high level, and also renders the contacts 23B, 23C conductive when said control signal P1 has a low level. The switch 24 renders the contacts 24A, 24C conductive when the control signal P2 has a high level, and also renders the contacts 24B, 24C conductive when the control signal P2 has a low level. Further, the switch 27 renders the contacts 27B, 27C conductive when the control signal P3 has a high level, and also renders the contacts 27A, 27C conductive when the control signal has a low level.

According to this invention, a time of delay produced between the control signals P1, P2 by the delay circuit 32 is chosen to be shorter than the period T2 during which the FM signals FM1, FM2 partly overlay each other. The changeover operation of the switch 23 between the contacts 23B and 23C and the changeover operation of the switch 24 between the contacts 24B and 24C are carried out at a prescribed interval. This interval is included in the aforementioned period during which the FM signals FM1, FM2 partly overlap each other.

Time point t11 shown in FIG. 3 is the point in time at which the operation of the switch 23 is changed over by shifting the connection of the movable contact 23C from the stationary contact 23A to the stationary contact 23B or vice versa. At this point in time t11, an output signal from the main FM demodulator 25 is contaminated by noises, as illustrated in FIG. 3(f). The succeeding point in time t21 is the point in time at which the operation of the switch 24 is changed over by shifting the connection of the movable contact 24C from the stationary contact 24A to the stationary contact 24B or vice versa. AT this point in time t21, an output signal from the auxiliary FM demodulator 26 is contaminated by noises illustrated in FIG. 3(g). Consequently, the switching noises involved in output signals from the main FM demodulator 25 and auxiliary FM demodulator 26 have different phases.

The switch 27 is controlled by a control signal P3. When an output signal from the main FM demodulator 25 contains noises, said switch 27 immediately selects a noiseless output signal from the auxiliary FM demodulator 26. In other words, when an output signal from the main FM demodulator 25 is contaminated by noises, as shown in FIG. 3(f), the electrical connection between the main FM demodulator 25 and output terminal 28 is shut off during time T1. This shut off period T1 is supplemented by an output signal from the auxiliary FM demodulator 26. An output signal from the auxiliary FM demodulator 26 sent forth during said shut off period T1 is free from switching noises. Therefore, an output signal emitted from an output terminal 28 is completely free from switching noises, as illustrated in FIG. 3(h).

For better understanding, FIGS. 3(f) and 3(g) indicate only noise components. During the shut off periods between points in time t12 and t22 as well as between the points in time t13 and t23, an output signal from the auxiliary FM demodulator 26 is issued as a supplement. To describe in detail, when an output signal from the main FM demodulator 25 is contaminated by switching noises, electrical connection between the main FM demodulator 25 and output terminal 28 is immediately shut off. An output signal from the auxiliary FM demodulator 26 supplements said shut off period. The shut off period continues for a length of time ranging from 10 to 30 microseconds, a duration falling outside of the audio band. If, therefore, the switch 27 is instantly changed over, no switching noises arise in an audio signal.

According to the above-mentioned noise-eliminating apparatus of this invention, only when an output demodulated signal from the main FM demodulator 25 is contaminated by switching noises, an output demodulated signal from the auxiliary FM demodulator 26 is used to provide a continuous audio signal. The application of said output demodulated signal from the auxiliary FM demodulator 26 is continued only for a moment involved in each field. An output demodulated signal from the main FM demodulator 25 is substantially applied throughout each field. Consequently, it is unnecessary to try to effect rigid coincidence between the properties of the main and auxiliary FM demodulators 25, 26 as has been practised in the conventional-eliminating apparatus. With the present invention, differences between the properties of both main and auxiliary FM demodulators 25, 26 raise practically no problems. The reason for this advantage is that the quality of an audio signal chiefly depends on the property of the main FM demodulator 25 and is not substantially governed by the property of the auxiliary FM demodulator 26. Therefore, it is possible to apply an inexpensive auxiliary FM demodulator 26. Since, there is no need to try to realize exact coincidence between the properties of both main and auxiliary FM demodulators 25, 26, the operation of matching the properties and functions of both FM demodulators 25, 26 can be carried out easily and quickly.

Elimination of the above-mentioned switching noises is effective to produce high quality voice signals when an output demodulated signal is supplied to a noisereduction system. This noise reduction system, which has a function of extending high frequency components, is accompanied with the drawback that switching noises contaminating a continuous audio signal tend to be amplified, preventing high quality sounds from being produced. This invention offers the advantage that when switching noises are eliminated by the noise reduction system and, thereafter, a continuous audio signal is supplied to said noise reduction system, good sounds can be reproduced.

The foregoing embodiment referred to the case where FM audio signals were constituted by signals recorded by the helical scan process. However, the recorded signals need not be limited to such a type. In other words, the audio signals may be formed of stereo signals, or signal demodulated by a plurality of carrier signals such as bilingual signals. Further, the noise-eliminating apparatus of this invention is applicable not only the FM signals but also to AM modulated signals.

Further, a switching means for shutting off the output from the demodulator 25 to the output terminal 28 may be used as a means which passes the output of the demodulator 25 to the ground.

What is claimed is:

1. A noise eliminating apparatus for a tape recorder which alternately processes first and second channels each of which have information thereon during a time when the other channel has no information thereon, and during an overlap period when both channels simultaneously have information thereon comprising:

main demodulation means, having an input terminal and an output terminal, for receiving an input signal, and demodulating said input signal to produce an output signal on said output terminal;

first channel selecting means, coupled to said first and second channels, for alternately selecting one of said first and second channels, and supplying the selected output as said input signal to said main demodulation means;

second demodulation means, having an input terminal and an output terminal, for receiving an input signal, and demodulating said input signal to produce an output signal on said output terminal;

second channel selecting means, coupled to said first and second channels, for alternately selecting one of said first and second channels as a selected output to be coupled as said input signal to said second demodulation means;

output selecting means, having an input coupled to said output signals of said main modulation means and said second demodulation means respectively, for selecting one of said output signals as a system output; and controlling means, coupled to said first and second channel selecting means and said output selecting means, for:

(1) first controlling said first channel selecting means to select one of said first and second channels;

(2) second controlling said second channel selecting means to select one of said first and second channels, said second controlling being delayed with respect to said first controlling by a delay time which is less than said overlap period of of said first and second channels; and (3) controlling said output selecting means so that said output of said second demodulation means is selected as said system output only when both of: (a) said first channel selecting means has switched from one of said channels to the other of said channels, and (b) said second channel selecting means has not yet switched from said one of said channels to said other of said channels.

2. The noise-eliminating apparatus according to claim 1, wherein said first and second channel-selecting means comprises:

first and second switches which respectively have first and second input terminals supplied with the signals of the corresponding first and second channels, and whose output terminals are respectively connected to the main and second demodulation means;

and wherein said controlling means includes delay means for producing a first control signal to alternately connect the stationary contact of said first switch to the first and second input terminals thereof, and for delaying said first control signal for a shorter period than that in which the signals of the first and second channels partly overlap each other, to produce a second control signal for alternately connecting the stationary contact of said second switch to the first and second input terminals thereof, and wherein said output-selecting means comprises:

a third switch, one input terminal of which is connected to the output terminal of said main demodulation means and the other input terminal of which is connected to the output terminal of said second demodulation means, and having an output terminal;

and wherein said controlling means also includes an exclusive OR circuit which is supplied with said first and second control signals, and whose exclusive logic output causes said third switch to alternately couple between said other input terminal and said output terminal, and said one input terminal and said output terminal.

3. The noise-eliminating apparatus according to claim 1, wherein said output-selecting switching means comprises:
switch means for passing the output of said main FM demodulator to the ground in order to shut off the output from said main FM demodulator to the output terminal.

4. An apparatus as in claim 1 wherein said first and second channels carry two FM signals reproduced by two video heads in a helical scan type video tape recorder.

5. A device for selectively demodulating one of two channels which have information thereon that overlaps with the other channel other during an overlap period, comprising:
first means, coupled to said first and second channels, for producing a first output signal representative of one of said two channels;
second means, coupled to said first and second channels in parallel with said first means, for producing a second output signal indicative of one of said two channels, said second output signal being delayed from said first output signal by an amount of time less than said overlap period;
first demodulation means, coupled to said output of said first means, for demodulating said output into a first demodulated output;
second demodulating means coupled to said second output of said second means, for demodulating said second output into a second demodulated output; and
output selecting means for selecting said second demodulated output during a time period which begins when said first means switches from one state to another state and ends when said second means switches from said one state to said an other state, for selecting said first demodulated output at all other times.

6. Apparatus as in claim 5 wherein said output selecting means includes means for producing control signals to said first and second means, and also includes an exclusive OR gate, coupled to said control signals for producing a control output when said first and second control signals differ in logic level.

7. An apparatus as in claim 5 wherein said first and second channels carry two FM signals reproduced by two video heads in a helical scan type video tape recorder.

8. A method for demodulating information which selectively appears during different time periods on first and second channels, and which appears on both of said first and second channels during an overlap period, comprising the steps of:
providing a first means having input signals indicative of said first and second channels and an output signal which is coupled to a first demodulation structure;
commanding said first means to switch between one of said channels and the other of said channels during said overlap period;
providing a second means coupled to its input terminals to said first and second channels and having an output terminal coupled to a second demodulating structure;
commanding said second menas to switch between said one of said channels and said other of said channels during said overlap period at a time later than said switching of said first means; and
selectively directing an output of said second demodulating structure as said system output only between the times of switching of said first means and said second means.

* * * * *